United States Patent

Fredericks et al.

[11] Patent Number: 5,224,316
[45] Date of Patent: Jul. 6, 1993

[54] TEXTURED INSULATED BUILDING PANEL

[76] Inventors: Chester P. Fredericks, 3535 W. 72nd Pl., Chicago, Ill. 60629; Paul M. Fredericks, 1632 Swallow, Naperville, Ill. 60565

[21] Appl. No.: 740,422
[22] Filed: Aug. 5, 1991
[51] Int. Cl.$^5$ .............................................. E04C 1/40
[52] U.S. Cl. .................. 52/309.7; 52/309.11; 52/454
[58] Field of Search ............... 52/309.6, 309.7, 309.12, 52/309.16, 268, 269, 343, 602, 612, 605, 443, 444, 448, 449, 453, 454, 409

[56] References Cited

U.S. PATENT DOCUMENTS

| | | | |
|---|---|---|---|
| 1,778,345 | 10/1930 | Venzie | 52/453 |
| 3,054,523 | 9/1962 | Batzer et al. | 52/269 |
| 4,113,907 | 9/1978 | Haage et al. | 52/309.16 |
| 4,159,361 | 6/1979 | Schupack | 52/449 X |
| 4,206,269 | 6/1980 | Jungbluth | 52/309.16 X |
| 4,301,198 | 11/1981 | Prior | 52/309.14 X |
| 4,351,870 | 9/1982 | English, Jr. | 52/309.7 X |
| 4,411,723 | 10/1983 | Takenchi | 156/242 |
| 4,590,733 | 5/1986 | Schneller et al. | 52/309.12 X |
| 4,677,800 | 7/1987 | Roodvoets | 52/309.12 |
| 4,712,349 | 12/1987 | Riley et al. | 52/309.12 X |
| 4,774,794 | 10/1988 | Grieb | 52/309.7 |
| 4,970,838 | 11/1990 | Phillips | 52/250 |

FOREIGN PATENT DOCUMENTS

| | | | |
|---|---|---|---|
| 2282381 | 8/1974 | France | 52/309.12 |
| 2339030 | 1/1976 | France | 52/309.6 |

Primary Examiner—Carl D. Friedman
Assistant Examiner—Kien Nguyen
Attorney, Agent, or Firm—Norman B. Rainer

[57] ABSTRACT

A composite panel product is provided which is intended to be applied as a multitude in building block manner to produce a thermally insulative covering assembly upon an existing wall of a building. The panel product is made of a rigid panel of closed cell polymer foam of rectangular perimeter having front and rear surfaces. The front surface has parallel upraised ridges. A stiff fabric is attached to the ridges, spanning the entire front surface and extending beyond two contiguous edges of the perimeter as spanning borders of uniform width. The spanning borders partially overlap and interlock adjacent panel products. A cementitious layer is applied to the fabric side of the assembly of panel product.

2 Claims, 2 Drawing Sheets

TEXTURED INSULATED BUILDING PANEL

BACKGROUND OF THE INVENTION

1. Field of the Invention

This invention relates to the insulative finishing of walls, and more particularly concerns a product to be applied to walls and a method for constructing a wall covering having a continuous cementitious outer layer.

2. Description of the Prior Art

A widely used method of exterior insulation and stucco wall construction involves fastening panels of expanded polystyrene insulation, generally measuring two foot by four foot by ¾ inch, to the outer face of an exterior wall. A uniform layer of portland cement is typically trowelled upon the outer surface of the polystyrene panels, and a reinforcing fabric such as an open weave scrim of continuous filament fiberglass is embedded into the wet cement. Once the cement has hardened, a finish stucco coat is applied by trowel and "floated" to a desired texture.

The glass fiber reinforcing fabric is generally available in a 36 inch wide, 100 foot roll, and has a square weave construction providing a mesh size of approximately ¼ inch. The fabric is typically cut to size from the roll by workers on scaffolding. Two workers are required to effectively unroll, cut and embed the fabric in the cement. Such work has inherent hazards due to sometimes windy conditions and unstable footing on scaffolding surfaces wet with cement. Additionally, sharp knives are needed to cut the fabric, and workers must stretch long spans while holding and controlling the draping of long sheets of cut fabric. The process is often time consuming due to the difficulty in embedding the fabric evenly, without buckles and folds, around various contours and overlapping adjacent polystyrene panels. Often the fabric must be pulled down, the cement smoothed, and the fabric reembedded. This is a costly process that generally requires two skilled laborers.

It would therefore be desirable to have construction products and methods which will achieve safer, faster, and qualitatively improved results in stucco wall construction without sacrificing structural strength.

Accordingly it is an object of the present invention to provide a thermally insulative panel product which affords improved anchoring of cementitious coatings employed in stucco wall construction.

It is another object of the present invention to provide a product of the aforesaid nature which will obviate the need for applying reinforcing fabric as a separate step in stucco wall construction.

It is yet another object of the invention to provide a product of the aforesaid nature which is stackable, simple to use, and amenable to low cost manufacture.

It is still another object of the present invention to provide a faster, and less hazardous method of construction of a stucco finish wall that may be accomplished by a single worker.

These objects and other objects and advantages of the invention will be apparent from the following description.

SUMMARY OF THE INVENTION

The above and other beneficial objects and advantages are accomplished in accordance with the present invention by a composite panel product comprised of:

a) a substantially flat insulating panel of closed cell polymer foam having front and rear parallel surfaces and a rectangular perimeter comprised of paired long edges and paired short edges, said front surface having a series of continuous parallel upraised ridges defining therebetween receiving regions, and b) a stiff fabric sheet attached to said ridges in a manner to cover the entire front surface, spanning said receiving regions in parallel disposition to said front surface, and protruding from two contiguous long and short edges as self-supporting spanning borders having a uniform width between about ¾" and 1½".

In the process of this invention, a multiplicity of the aforesaid panel product is disposed upon an exterior wall of a building in an orientation such that the corresponding long and short edges of adjacent panels are in abutment and the spanning borders of each panel are disposed upon the front surfaces of two adjacent panels to form overlap regions of doubled fabric thickness disposed along two contiguous edges of each panel. A cement mixture is then trowelled upon the front surfaces of the aforesaid assembly of panel product as a uniform layer, causing the cement to enter said receiving regions and engulf said fabric. Upon drying of the cement, a surface coating of desired texture is applied upon the cement layer.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
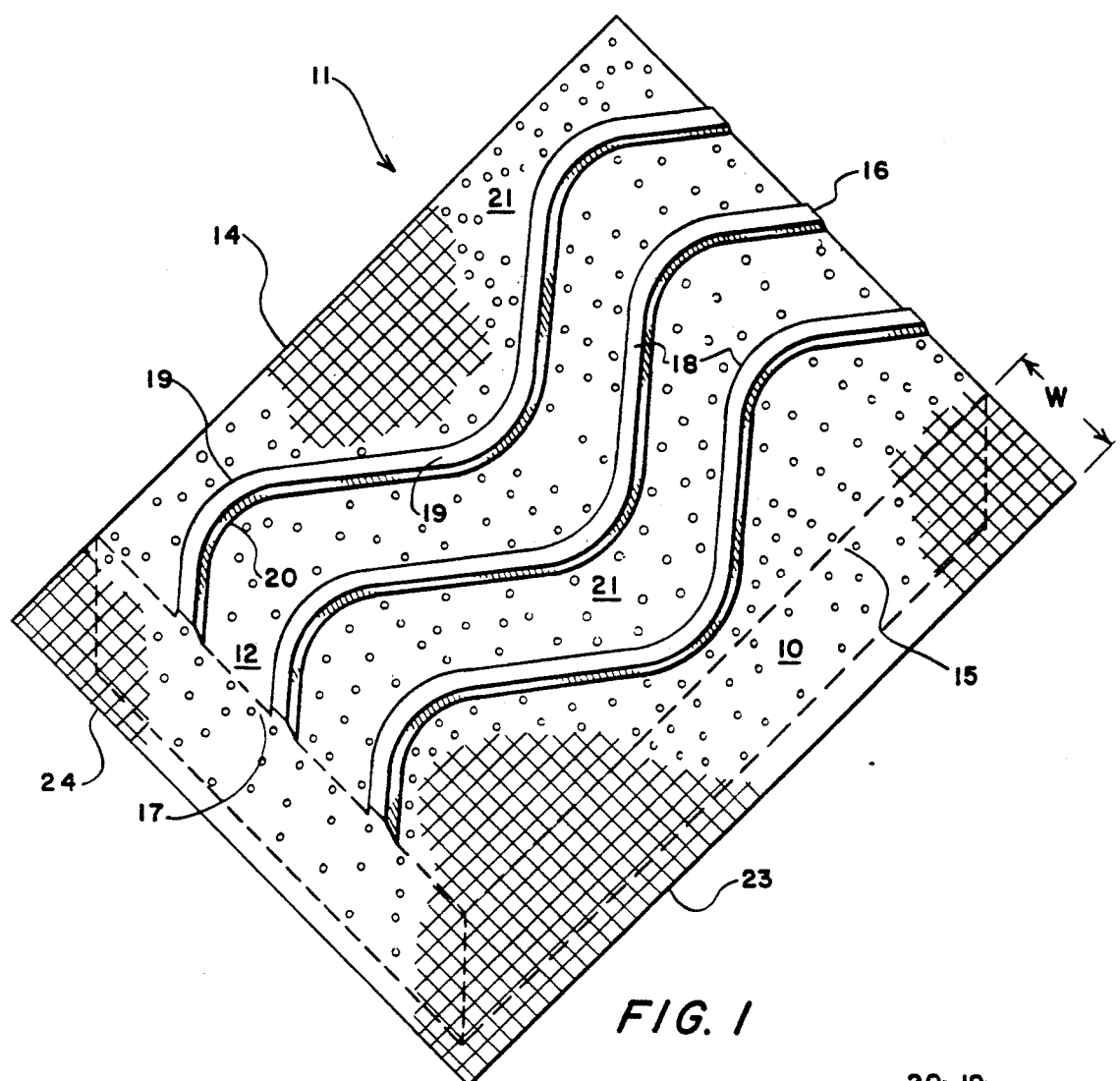
FIG. 1 is a front perspective view of an embodiment of the panel product of the present invention.

Referring to FIGS. 1-4, an embodiment of the panel product of the present invention is shown comprised of insulating panel 10 and fabric sheet 11.

Panel 10, fabricated of closed cell, rigid polystyrene foam, has front and rear parallel surfaces, 12 and 13, respectively, and a rectangular perimeter comprised of paired long edges 14 and 15, and paired short edges 16 and 17. The thickness of the panel, namely the distance between surfaces 12 and 13, may range between about ¾" and 4". The length of the panel, namely the orthogonal distance between short edges 16 and 17 may typically be about 4 feet. The width of the panel, namely the orthogonal distance between long edges 14 and 15, may typically be about 2 feet. In use, the panels are generally arranged such that the long edges are horizontally disposed.

Three continuous and parallel sinusoidally contoured ridges 18 are upraised from front surface 12 and define therewith receiving regions 21. The shown ridges are continuous integral extensions of the panel, formed during a molding operation which produces the panel. The exemplified ridges have a uniform cross-sectional configuration defining a flat forward portion 19 of about ⅜" width and side edges 20 projecting about 3/32" from front surface 12. Different numbers of ridges may be employed, and their contour may be varied. The sinusoidal contour is preferred because it enhances distribution of cementitious material. The direction of elongation of the ridges is preferably parallel to the long edges of the panel because it prevents sagging of the cementitious material.

The illustrated fabric sheet 11 is of square weave construction, generally referred to as a scrim, having a mesh size of about ¼". The fabric is made of strong continuous multifilament yarns such as fiberglass or polypropylene, and the yarns are preferably coated with a sizing finish which holds the filaments rigidly together and produces a very stiff fabric. In a particularly preferred fabric, the warp yarns are traversed by double weft yarns which embrace each warp yarn. In such manner of weave, despite the very large mesh size, all yarns are locked in place. Further stabilization of the fabric is achieved by application of a sizing or bonding agent.

Fabric sheet 11 is of generally rectangular shape, having larger length and width dimensions than the corresponding dimensions of the panel. The sheet is attached to the flat forward portions 19 of ridges 18 by means of adhesive agents in a manner to cover the entire front surface of the panel while spanning said receiving regions. The sheet protrudes from two contiguous long and short edges, 15 and 17, respectively, as self-supporting spanning borders 23 and 24, respectively. Said spanning borders have a uniform width W between about ¾" and 1½". Because of the very special stiffness of the fabric sheet, the spanning borders are relatively rigid and remain disposed in a plane parallel to front surface 12.

Figure 2:
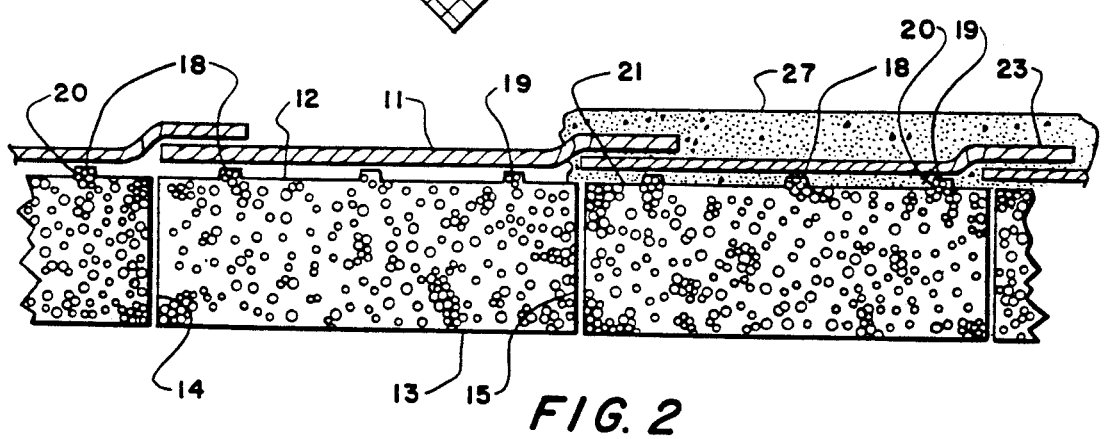
FIG. 2 is an end view of an embodiment of FIG. 1 shown in assembled relationship with other identical panel products.
Figure 3:
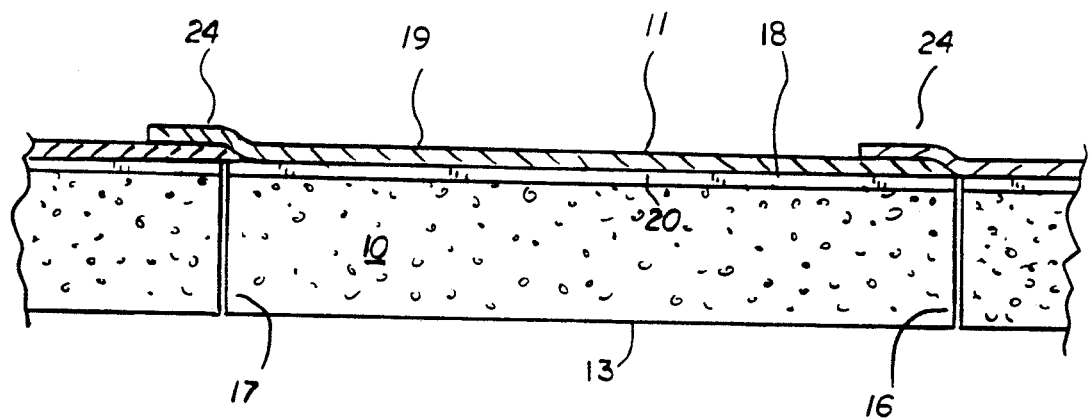
FIG. 3 is a side view of the embodiment of FIG. 1 shown in assembled relationship with other identical panel products.
Figure 4:
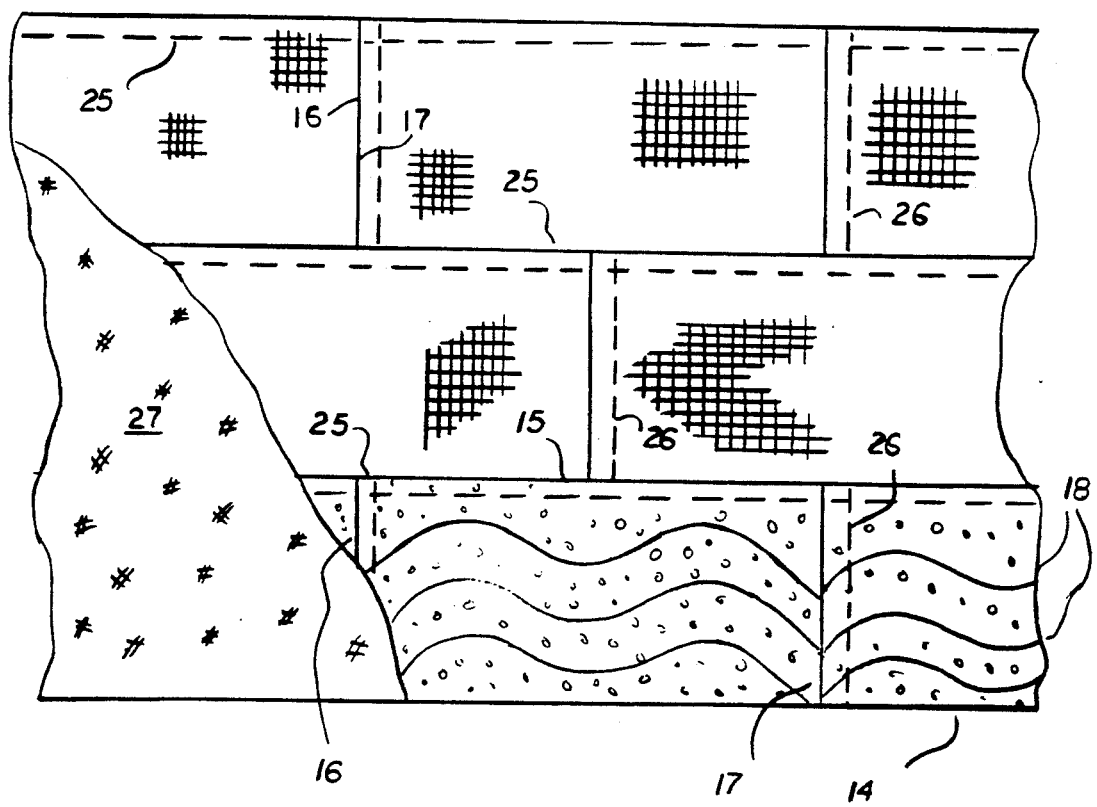
FIG. 4 is a front plan view of an assemblage of the panel product of FIG. 1.

In utilizing the panel product of this invention to provide an exterior insulated wall surface, a multiplicity of the panel product is disposed upon the exterior wall of a building as best shown in FIG. 4 in an orientation such that the corresponding long and short edges of adjacent panels are in abutment. The ridges are in alignment so as to extend continuously between adjacent lateral panels. Spanning borders 23 and 24 of each panel are thereby disposed upon the front surfaces of two adjacent panels to form overlap regions 25 and 26, respectively, having doubled fabric thickness. Said overlap regions are disposed upon each panel along the two contiguous edges that do not support spanning borders. A cement mixture 27 is then trowelled onto the front surfaces of the assembly of panel product as a uniform layer. As best shown in FIG. 2, the cement enters receiving regions 21, and engulfs fabric sheet 11. Upon drying of the cement, a surface coating of desired texture is applied upon the cement layer.

Because of the overlap regions, the receiving regions, and other aspects of the configuration of the panel product, a strong wall structure is produced by way of a simplified and faster method of construction.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A composite panel product comprised of:
  a) a substantially flat rigid insulating panel of closed cell polymer foam having front and rear parallel surfaces and a rectangular perimeter comprised of paired long edges and paired short edges, said front surface having a series of continuous parallel upraised ridges of sinusoidal contour defining therebetween receiving regions, and
  b) a stiff fabric sheet attached to said ridges in a manner to cover the entire front surface, spanning said receiving regions in parallel disposition to said front surface, and protruding from two contiguous long and short edges as self-supporting spanning borders having a uniform width between about ¾" and 1½".

2. The panel product of claim 1 having a thickness, measured between said front and rear surfaces, of between ⅜" and 4".

* * * * *